United States Patent
Xie et al.

(10) Patent No.: US 8,762,477 B2
(45) Date of Patent: Jun. 24, 2014

(54) METHOD FOR COLLABORATIVE CACHING FOR CONTENT-ORIENTED NETWORKS

(75) Inventors: Haiyong Xie, Union City, CA (US); Guangyu Shi, Cupertino, CA (US); Shuo Guo, San Jose, CA (US)

(73) Assignee: Futurewei Technologies, Inc., Plano, TX (US)

(*) Notice: Subject to any disclaimer, the term of this patent is extended or adjusted under 35 U.S.C. 154(b) by 60 days.

(21) Appl. No.: 13/407,371

(22) Filed: Feb. 28, 2012

(65) Prior Publication Data

US 2013/0227048 A1    Aug. 29, 2013

(51) Int. Cl.
*G06F 15/167*    (2006.01)

(52) U.S. Cl.
USPC .......................................... 709/213; 709/223

(58) Field of Classification Search
USPC .......................... 709/213, 220, 223, 230, 238
See application file for complete search history.

(56) References Cited

FOREIGN PATENT DOCUMENTS

| WO | 03034255 A1 | 4/2003 |
|---|---|---|
| WO | 2010140935 A1 | 12/2010 |

OTHER PUBLICATIONS

COPSS: An Efficient Content Oriented Publish/Subscribe System Authors: Jiachen Chen, et al. Published in: Architectures for Networking and Communications Systems (ANCS), 2011 Seventh ACM/IEEE Symposium on Date of Conference: Oct. 3-4, 2011; pp. 99-110.*

Routing Policies in Named Data Networking Authors: Steve DiBenedetto, et al. ICN'11, Aug. 19, 2011, Toronto, Ontario, Canada. Copyright 2011 ACM 978-1-4503-0801-4/11/08.*

Korupolu, et al., "Coordinated Placement and Replacement For Large-Scale Distributed Caches," IEEE Transactions on Knowledge and Data Engineering, vol. 14, No. 6, Nov./Dec. 2002, pp. 1317-1329.

Gadde, et al, "Web Caching and Content Distribution: A View From the Interior," Computer Communications, vol. 24, No. 2, 2001, pp. 222-231.

Hefeeda, et al., "On the Benefits of Cooperative Proxy Caching for Peer-to-Peer Traffic," IEEE Transactions on Parallel and Distributed Systems, vol. 21, No. 7, Jul. 2010, pp. 998-1010.

Anand, et al., "XIA: An Architecture for An Evolvable and Trustworthy Internet," School of Computer Science, Carnegie Mellon University, Tech. Rep. CMU-CS-11-100, Jan. 2011, 32 pages.

Anderson, et al., "NEBULA—A Future Internet That Supports Trustworthy Cloud Computing," White Paper, 2010, 31 pages.

Sarkar,et al., "Hint-Based Cooperative Caching," ACM Transactions on Computer Systems, vol. 18, No. 4, Nov. 2000, pp. 387-419.

Dykes, et al., "A Viability Analysis of Cooperative Proxy Caching," in IEEE INFOCOM 2001, Anchorage, AK, Apr. 2001, pp. 1205-1214.

(Continued)

*Primary Examiner* — Larry Donaghue
*Assistant Examiner* — Marshall McLeod
(74) *Attorney, Agent, or Firm* — Conley Rose, P.C.; Grant Rodolph; Brandt D. Howell

(57) ABSTRACT

A content router comprising a plurality of interfaces configured to receive and forward a plurality of interests for content and content data in a content oriented network (CON), a cache configured to store content data, and a memory component configured to maintain a forward information base (FIB) that associates content with one or more interfaces on which the interests and content data are received and forwarded, and an availability FIB (AFIB) that associates content data with one or more corresponding collaborative caching routers in the CON that cache the content data.

21 Claims, 11 Drawing Sheets

(56) References Cited

OTHER PUBLICATIONS

Akamai Technologies, "The Leader in Web Application Acceleration and Performance Management," http://www.akamai.com., 2 pages.

Level 3 Communications, "Stronger Connections—New Possibilities", http://www.level3.com., 2 pages.

Limelight Networks, http://www.limelight.com., 2 pages.

Content Delivery Netowork, CDN, CDNetworks, http://www.cdnetworks.com., 3 pages.

Amazon Web Services, "Amazon CloudFront," http://www.amazon.com/cloudfront., 7 pages.

Pathan, et al., "Content Delivery Networks: State of the Art, Insights, and Imperatives," Content Delivery Networks, Ser. Lecture Notes in Electrical Engineering, Springer Berlin Heidelberg, 2008, vol. 9, pp. 3-32.

Erman, et al., "To Cache or Not to Cache: The 3G Case," IEEE Internet Computing, vol. 15, Mar./Apr. 2011, pp. 27-34.

Wessels, et al., "RFC 2186—Internet Cache Protocol (ICP), Version 2," United States, 1997, 12 pages.

BitTorrent, "Delivering the World's Content," http://www.bittorrent.com., 1 page.

eMule-Project.net, http://www.emule-project.net., 1 page.

Global IP Network Latency, "AT&T Network," http://ipnetwork.bgtmo.ip.att.net., Feb. 27, 2012, 1 page.

Geant, "GEANT, The World's Most Advanced International Research Network" Information Society Technologies, http://archive.geant.net/upload/pdf/Topology Oct 2004.pdf., 1 page.

CERNET Topology, http://www.edu.cn/20060111/3170194.shtml., Copyright 2011, Huawei Technologies 20 of 21CONA Architecture Public, 1 page.

Cheng, et al., "Statistics and Social Network of YouTube Videos," School of Computing Science, IEEE, Proc. IWQoS 2008, Jun. 2008, pp. 229-238.

Gill, et al., "YouTube Traffic Characterization: A View From The Edge," Proc. ACM IMC 2007, New York, NY, USA: ACM, 2007, 14 pages.

Foreign Communication From A Counterpart Application, PCT Application PCT/US2013/027387, International Search Report dated May 27, 2013, 5 pages.

Foreign Communication From A Counterpart Application, PCT Application PCT/US2013/027387, Written Opinion dated May 27, 2013, 6 pages.

Chen, J., et al., "COPSS: An Efficient Content Oriented Publish/Subscribe System," 2011 Seventh ACM/IEEE Symposium on Architectures for Networking and Communications Systems, IEEE Computer Society, Oct. 3-4, 2011, pp. 99-110.

Sripanidkulchai, K., et al., "Efficient Content Location Using Interest-Based Locality in Peer-to-Peer Systems," XP-002473822, Carnegie Mellon University Research Showcase, School of Computer Science, Mar. 1, 2003, 11 pages.

Jacobson, et al., "Networking Named Content," CoNEXT '09, Dec. 1-4, 2009, Rome, Italy, 12 pages.

Zhang, et al., "Named Data Networking (NDN) Project," NDN-0001, Oct. 31, 2010, 26 pages.

Dannewitz, "NetInf: An information-Centric Design For The Future Internet," Proc. 3rd, GI/ITG KuVS Workshop on The Future Internet, May 2009.

Fan, et al. "Summary Cache: A Scalable Wide-Area Web Cache Sharing Protocol," IEEE/ACM Transactions on Networking, vol. 8, No. 3, Jun. 3, 2000, 13 pages.

Ni, et al., "Large-Sscale Cooperative Caching and Application-Level Multicast in Multimedia Content Delivery Networks," Communications Magazine, IEEE, vol. 43, No. 5, May 2005, 8 pages.

Borst, et al., "Distributed Caching Algorithms For Content Distribution Networks," IEEE INFOCOM 2010, San Diego, CA, Mar. 2010, 9 pages.

Dilley, et al., "Globally Distributed Content Delivery," IEEE Internet Computing, vol. Sep./Oct. 2002, pp. 50-58.

Yin, et al., "Supporting Cooperative Caching In Ad Hoc Networks," IEEE Transactions on Mobile Computing, vol. 5, No. 1, Jan. 2006, pp. 77-89.

Sailhan, et al., "Cooperative Caching In Ad Hoc Networks," Mobile Data Management, Ser. Lecture Notes in Computer Science, Springer Berlin / Heidelberg, 2003, vol. 2574, pp. 13-28.

Chow, et al., "Distributed Group-Based Cooperative Caching In a Mobile Broadcast Environment," Proc. of Mobile Data Management '05, 2005, pp. 97-106.

Wolman, et al., "On The Scale and Performance of Cooperative Web Proxy Caching," Department of Computer Science and Engineering, Proc. ACM SOSP 1999, pp. 16-31.

Breslau, et al., "Web Caching and Zipf-Like Distributions: Evidence and Implications," IEEE INFOCOM 1999, vol. 1, Mar. 1999.

* cited by examiner

METHOD FOR COLLABORATIVE CACHING FOR CONTENT-ORIENTED NETWORKS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In a content oriented network (CON), a content router is responsible for routing user requests and content to proper recipients. In the CON, also referred to as an Information-Centric Network (ICN), a domain-wide unique name is assigned to each entity that is part of a content delivery framework. The entities may comprise data content, such as video clips or web pages, and/or infrastructure elements, such as routers, switches, or servers. The content router uses name prefixes, which can be full content names or proper prefixes of content names instead of network addresses, to route content packets within the content network. In the CON, content delivery including publishing, requesting, managing (e.g., modification, deletion, etc.) may be based on content name and not content location. One aspect of the CON that may be different from traditional Internet Protocol (IP) networks is the ability of the CON to interconnect multiple geographical points and cache content temporarily or store content on a more persistent basis. This may allow content to be served from the network instead of an original server, and thus may substantially improve user experience. The caching/storing may be used for real time data that is fetched by the user or for persistent data that belongs to the user or to a content provider, e.g., a third party provider.

SUMMARY

In one embodiment, the disclosure includes a content router comprising a plurality of interfaces configured to receive and forward a plurality of interest for content and content data in a CON, a cache configured to store content data, and a memory component configured to maintain a forward information base (FIB) that associates content with one or more interfaces on which the interests and content data are received and forwarded, and an availability FIB (AFIB) that associates content data with one or more corresponding collaborative content routers in the CON that cache the content data.

In another embodiment, the disclosure includes a network component comprising a transmitter/receiver (transceiver) configured to receive and forward interests and content data in a network, a memory comprising a content store (CS) for caching content, a pending interest table (PIT) for tracking pending requests for content, a FIB for associating content with one or more interfaces, and an AFIB for associating content with one or more collaborative caches and ranking the content according to content popularity in the network.

In yet another embodiment, the disclosure includes a method implemented by a network component, comprising joint collaborative caching for a plurality of content objects that are distributed between a plurality of content routers in a network, maintaining a plurality of mappings between the cached and distributed content objects and the corresponding caching content routers, and forwarding, using a transmitter, a plurality of received interests and data for the content objects among the content routers at a data plane.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
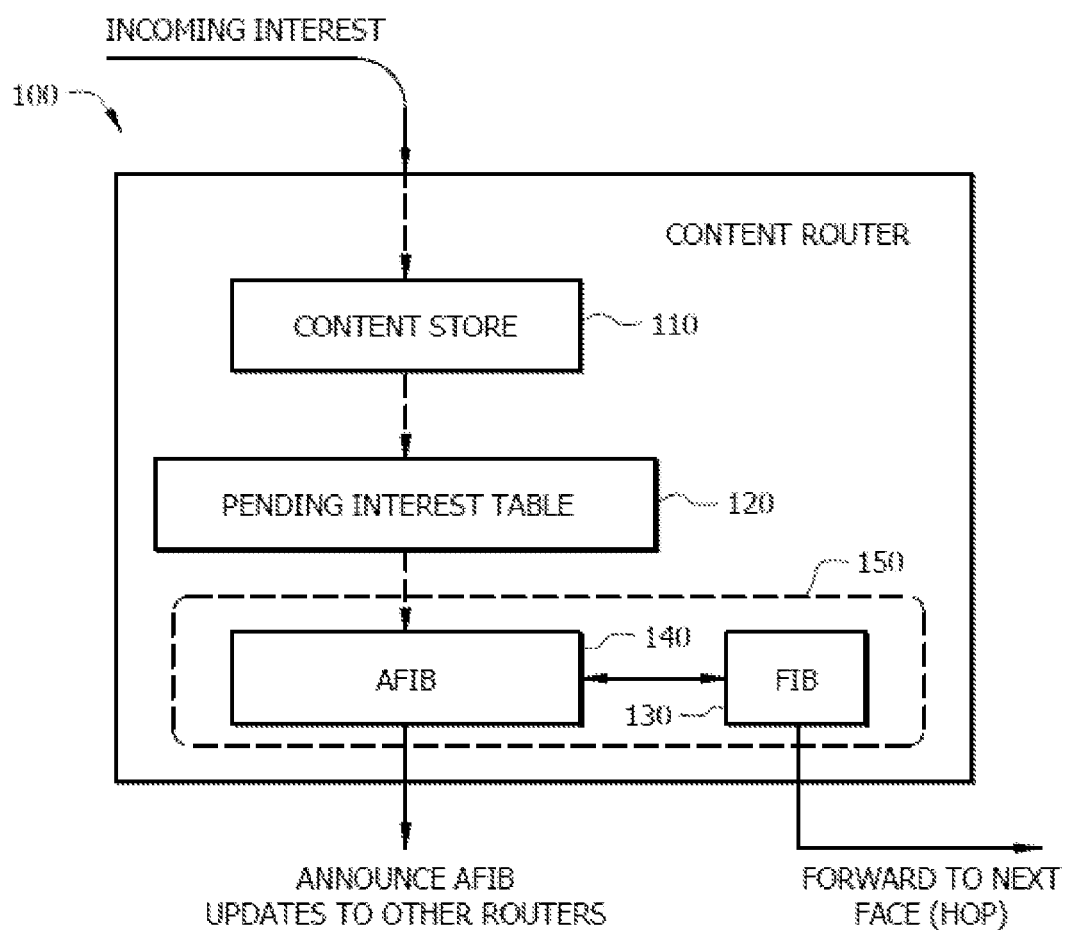
FIG. 1 is a schematic diagram of an embodiment of a collaborative caching content router.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Content caching is one function of a CON, where content routers are capable of caching/storing content. This caching function may reduce access cost to the network and may also substantially reduce access time as experienced by end users. The content routers may cache popular content, which may be content that is more requested and/or accessed than other content. The popular content may be cached in content routers of the CON and then delivered from the content routers (instead of the source servers or providers) to improve delivery time to users (requesters). Collaborative caching is another feature that may be used in the CON, where multiple content routers may be allowed to collaborate with each other and change information about cached content to improve or optimize overall caching performance. However, if collaborations (to achieve collaborative caching) among the content routers are not carefully designed, then communications costs, e.g., the number of messages exchanged to enable the content routers to enable collaborations and information exchanges, may significantly increase. The exchanged messages may comprise information about what content objects are stored in one or more content routers, and hence may substantially consume network bandwidth. Additionally, the added latency of exchanging such messages may slow down the collaborative decision making process, and thus reduce efficiency.

For example, one approach to collaborative caching may be to use a broadcast mechanism, where each request may be sent to all collaborative caches (in the collaborating content routers) but in return one of the caches that stores the requested content may reply with the requested data. This approach may reduce the control traffic for collaboration but the broadcast of the request may incur extra cost. The broadcast of a plurality of requests to all or multiple collaborative caches, even in relatively small networks (e.g., regional networks that comprise about dozens of content routers and cover a geographic area), may introduce substantial cost. Providing collaborative caches (at different content routers) with the knowledge of content stored in other collaborative caches to avoid broadcasting requests and using message exchanges that have substantial cost may be challenging.

Disclosed herein is a system and method for providing collaborative caching in a CON. The collaborative caching may be based on popularity-ranking of popular content distributed in the CON. The system and method may use an algorithm for caching content based on the content popularity when the popularity-ranking information reflects actual request patterns in the CON. The system and method may also use a self-adaptive algorithm and system design for collaborative caching when the collected popularity-ranking information is skewed or partially reflects actual request patterns. The system and method may not require the broadcast of request to all collaborative caches and may not use substantial message exchanges between the content routers, which may reduce cost and improve collaborative caching efficiency in the CON.

Content popularity may be measured in a distributed manner between content routers, where each content router may measure the frequency of corresponding content requests, e.g., in real time. A content router may obtain information about content objects cached or stored at other content routers by checking a local content popularity table or database, also referred to herein as a popularity ranking sequence. Since content popularity may be different when measured from different content routers, a two-segment cache space division design may be used to adapt to popularity inconsistency caused by the mismatches in the popularity ranking sequences by different content routers. The two-segment cache space division may use an extra cache space to handle inconsistent content requests. An adaptive cache division algorithm may also be used to dynamically change the cache division result based on different levels of inconsistency experienced by different content routers. The details of the algorithms and system configurations are described in detail below.

FIG. 1 illustrates an embodiment of a collaborative caching content router 100, which may be configured to implement popularity-ranking based collaborative caching in a CON. The collaborative caching router 100 may collaborate for caching content with one or more other content routers (not shown), which may be configured similarly, as described below. The collaborative caching content router 100 may comprise a CS 110, a PIT 120, a FIB 130, and an AFIB 140. The content store 110 may be used (e.g., in a storage or memory unit) to cache (for relatively short time) or store (for relatively longer time) content data. The CS 110 may also receive and associate interests (user requests for content) with corresponding content data (requested content). The PIT 120 may be any data structure (e.g., a table, list, or database) used to record and keep track of the received interests (requests for content) that are being served or pending (until the corresponding requested content data is received). The interests may be associated in the PIT 120 with the next hops (or next hop interfaces or faces) of the collaborative caching content router 100 on which the interests were received.

The FIB 130 may be any data structure (e.g., a table, list, or database) used to associate content with corresponding ports or faces (for next hops) on which the interests and content data are received and forwarded. The FIB 130 entries may indicate the next hops on which content (interests and data) may be forwarded. The AFIB 140 may be a content availability/popularity based FIB that associates content with corresponding content routers (e.g., collaborative caching content router) that cache or store the content. The AFIB 140 may indicate available content or popular content, which may be a subset of content that is more requested and accessed than other content. The collaborative caching content router 100 may advertise the AFIB 140 updates to other content routers (e.g., collaborative caching content routers). The FIB 130 and the AFIB 140 may be combined into one data structure 150 (e.g., a table, list, or database). The FIB 130 and the AFIB 140 may be maintained and operated (to process content interest and data) at a data plane or forwarding plane. The AFIB 140 updates may be advertised to other content routers at a control plane separate from the data (or forwarding) plane, e.g., implemented by a different entity or engine. The data plane may comprise operations for transferring content information (interest and data) in the CON, and the control plane may comprise operations related to controlling network operations including the data plane operations. The data structures above may be stored and maintained in a storage or memory unit of the collaborative caching content router 100.

Figure 2:
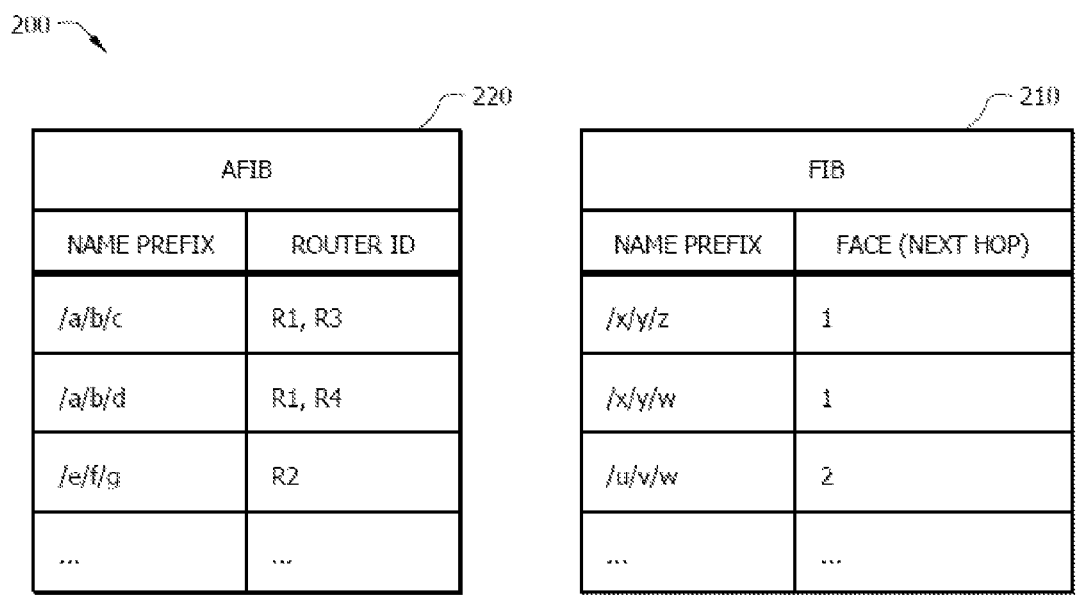
FIG. 2 is a schematic diagram of an embodiment of collaborative caching data structures.

FIG. 2 illustrates an embodiment of collaborative caching data structures 200, which may be used in the collaborative caching content router 100. The collaborative caching data structures 200 may comprise a FIB 210 and an AFIB 220, which may correspond to the FIB 130 and the AFIB 140, respectively. The FIB 210 may store mappings between content name prefixes and corresponding next hop faces. For example, the FIB 210 may comprise a "Name Prefix" column that indicates each content object name prefix and a "Face" column that indicates the corresponding face (interface) or port for a next hop (or next hop face). The AFIB 220 may store mappings between content name prefixes and corresponding content routers that cache or store associated content objects. For example, the AFIB 220 may comprise a "Name Prefix" column that indicates each content object name prefix and a "Router ID" column that indicates corresponding content routers identifiers (IDs) where associated content objects may be cached or stored. Each entry (row) in the AFIB 220 may be mapped to a corresponding entry (row) in the FIB 210. For instance, the Name Prefix column of the AFIB 220 may be mapped or matched to the Name Prefix column of the FIB 210.

Figure 3:
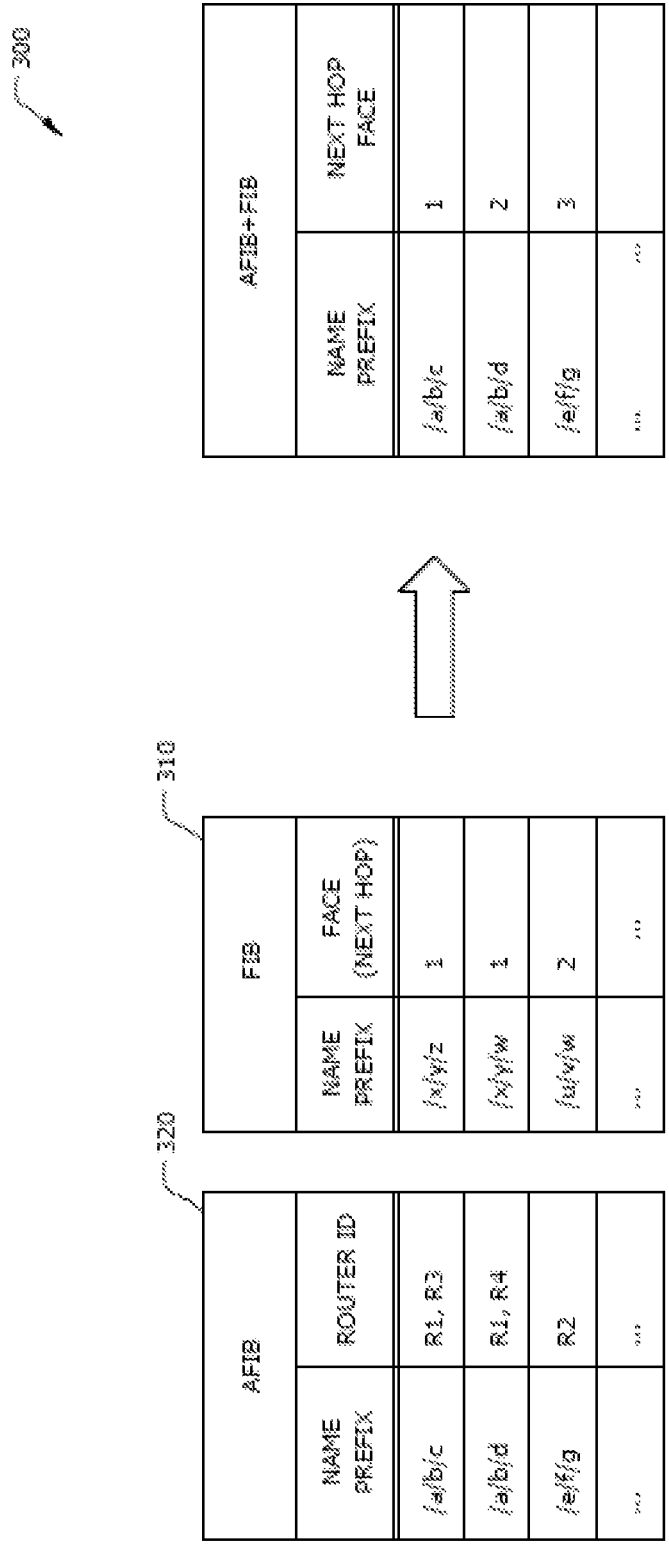
FIG. 3 is a schematic diagram of another embodiment of a combined collaborative caching data structure.

FIG. 3 illustrates an embodiment of a combined collaborative caching data structure 300, which may be used in the collaborative caching content router 100. The combined collaborative caching data structure 300 may merge a FIB 310 and an AFIB 320, and hence reduce storage cost and/or process time. The combined collaborative caching data structure 300, the FIB 310, and the AFIB 320 may correspond to the data structure 150, the FIB 130, and the AFIB 140, respectively. The combined collaborative caching data structure 300 may store mappings between content name prefixes, content routers that cache or store associated content objects, and corresponding name hop faces.

The combined collaborative caching data structure 300 may comprise a "Name Prefix" column that combines each content object name prefix with one or more corresponding content router IDs where associated content objects may be cached or stored. The combined collaborative caching data structure 300 may also comprise a "Next Hop Face" column that indicates the next hop faces corresponding to the content name prefixes. For example, the "Name Prefix" column of the combined collaborative caching data structure 300 may combine or merge information from both the "Name Prefix" column and the "Router ID" column of the AFIB 320. The information in the "Next Hop Face" column of the combined collaborative caching data structure 300 may correspond to the information from the "Face" column of the FIB 310.

In an embodiment, a CON that may be managed by an administrative domain may comprise N routers (N is an integer), e.g., such as the collaborative caching content router 100. Each router i may have a local cache, which may store up to $C_i$ content objects (i and $C_i$ are integers), and where u is maximum size of each content object. The content objects may be partitioned into pieces (portions), where each piece may fit one cache unit (e.g., the size of each piece may be less than or equal to about u). The CON may cache at most Cu of data, where $C=\Sigma_{i=1}^{N} C_i$. Users that may be interested in the content objects may send requests or interests (messages or packets) to corresponding near routers.

The N routers may collaborate to provide cached content. Specifically, upon receiving an interest, a router may check whether the content is available in its local cache. If the content is available, then the router may serve the request using the locally cached content. Otherwise, the router may check whether the content is available from other collaborative caches (in other routers) before requesting the content from the origin (e.g., the source of the content). The content may be served from a collaborative cache if available instead of the origin of the content, which may save substantial time for content delivery to the user.

The link status information and link costs between any pair of adjacent routers i and j (denoted by $d_{ij}$) may be available at each router. The routers may also share with each other their cache sizes ($C_i$'s) and the average number of received interests per unit (denoted by $R_i$ for router i), also referred to herein as Received Interest Rates. In the CON, e.g., according to intra-domain settings, topological information may be distributed by intra-domain routing protocols, such as Open Shortest Path First (OSPF) and/or Intermediate System to Intermediate System (ISIS). For instance, link costs may correspond to interior gateway protocol (IGP) link weights, or other metrics (e.g., distance, latency) that the CON may carry. The metrics may be distributed across the routers' domain, e.g. using OSPF Type-Length-Value (TLV) messages. Information relevant to collaborative caching may also be distributed similarly. Interests may contribute to a router's Received Interest Rate if the interests are sent to the router by a user and not by another router. An additional bit in the interest packet may be used or set to indicate to the router whether the interest is sent from a user or from a collaborative caching router, also referred to herein as a collaborative router.

To increase or maximize the use of limited cache space, collaborative caching design may include two optimization objectives. First, the collaborative caches (at the routers) may store the most popular content objects if possible. Second, the collaborative caches may also cache as many content objects as possible with the least overlapping between the caches and at a sufficiently low communication cost. To achieve such design optimization objectives, a ranking sequence may be used (e.g., $r_1, r_2, \ldots, r_C$) to denote the most popular C content objects, e.g., which may be sorted in descending order of popularity. The ranking sequences may be measured in real-time as routers receive interests. The routers may see similar distribution of content popularity, and accordingly the ranking sequence $r_1, r_2, \ldots, r_C$ measured by all or a plurality of routers may be about the same and may include some relatively low percentage of mismatches or shifts.

Figure 4:
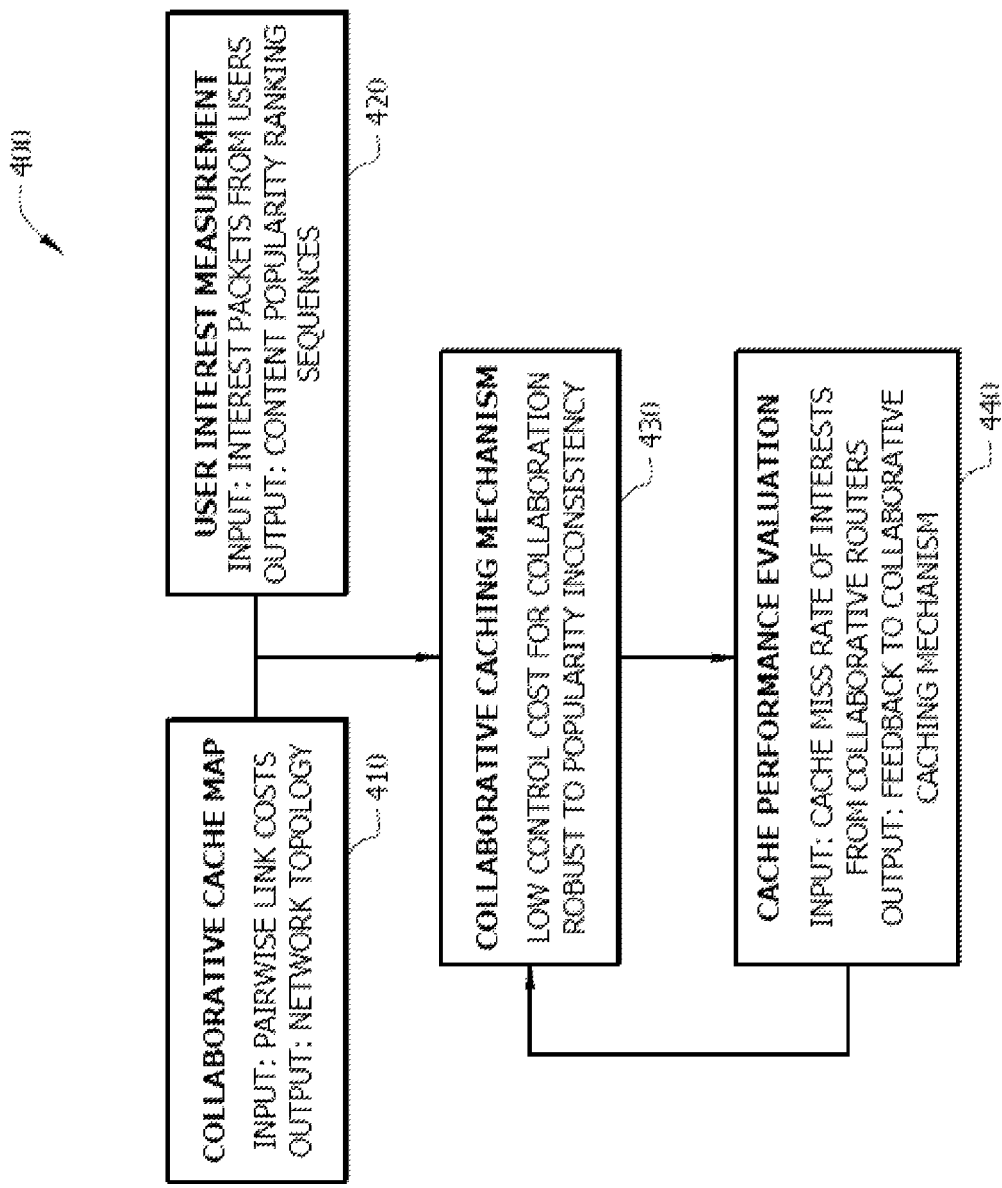
FIG. 4 is a schematic diagram of an embodiment of a collaborative caching system.

FIG. 4 illustrates an embodiment of a collaborative caching system 400, which may be used in a CON, e.g., in a collaborative caching content router, such as the collaborative caching content router 100. The collaborative caching system 400 may comprise a collaborative cache map component 410, a user interest measurement component 420, a collaborative caching mechanism component 430, and a cache performance evaluation component 440.

The collaborative cache map component 410 may receive and gather (at the router) propagated information regarding the network topology and collaborative caching. For instance, each router may periodically announce the pairwise link cost and collaborative caching related metrics to the entire network via OSPF or ISIS intra-domain routing protocols. The user interest measurement component 420 may measure the ranking sequence (at the router). In this component, each router may receive interests from the users as input, and output the ranking sequence of the most popular C content objects. With the outputs from the collaborative cache map component 410 and the user interest measurement component 420, the collaborative caching mechanism component 430 may utilize a distributed mechanism to cache the most popular C content objects in the network. This component may be designed to have relatively low collaboration cost and easily adapt to dynamic content popularity inconsistency, such as the mismatches in the ranking sequences measured by different routers. The cache performance evaluation component 440 may measure the cache miss rate of the interests sent from other collaborative routers and provide feedback to the collaborative cache component 430 to further improve the caching efficiency.

With the interests sent from users to their nearest routers, each router may keep track of the most popular C content objects. Each router may see the same popularity distribution for the most popular C content objects. For instance, the most popular C content objects at each router may present about the same ranking sequence $\{r_1, r_2, \ldots, r_c\}$. The most popular C content objects in the N routers may be distributed to optimize the average access cost in the network. As described above, the Received Interest Rate, $R_i$, represents the average number of interests received by router i, and dij represents the link cost of nodes i and j ($d_{ij}$ may represent the cost of accessing a local cache when i is equal to j). Such cost may correspond to either intra-domain routing weights or other performance-related metrics, such as distance and/or latency. For any cache unit in router i, the average cost for accessing this content from the users serviced by the N routers may be calculated as $$cost_i = \frac{\sum_{k=1}^{N} R_k d_{ki}}{\sum_{k=1}^{N} R_k},$$

where $cost_i$ is the weighted sum of the pair-wise access costs from all the N routers.

With the topology information, a router may calculate the cost values of all or a plurality of other collaborative routers in the network and sort the routers based on their cost values. The most popular C content objects may be allocated to these routers. Specifically, the most popular content objects may be assigned to the router with the least cost value, and the less popular content objects may be assigned to the router with a larger cost. As such, for any top-C popular content, each router may be aware from which collaborative cache to request this content object, as well as which content objects the router may keep in the router's local cache. Upon receiving an interest packet, a router may check whether the popularity rank of this content is larger than C. If this is true, then the content may not be stored or cached in a router in the network, and thus the router may request this content from the origin. Otherwise, if the popularity rank of this content is smaller than C, then the router may forward the request to the corresponding collaborative cache, and thus fetch the content.

Figure 5:
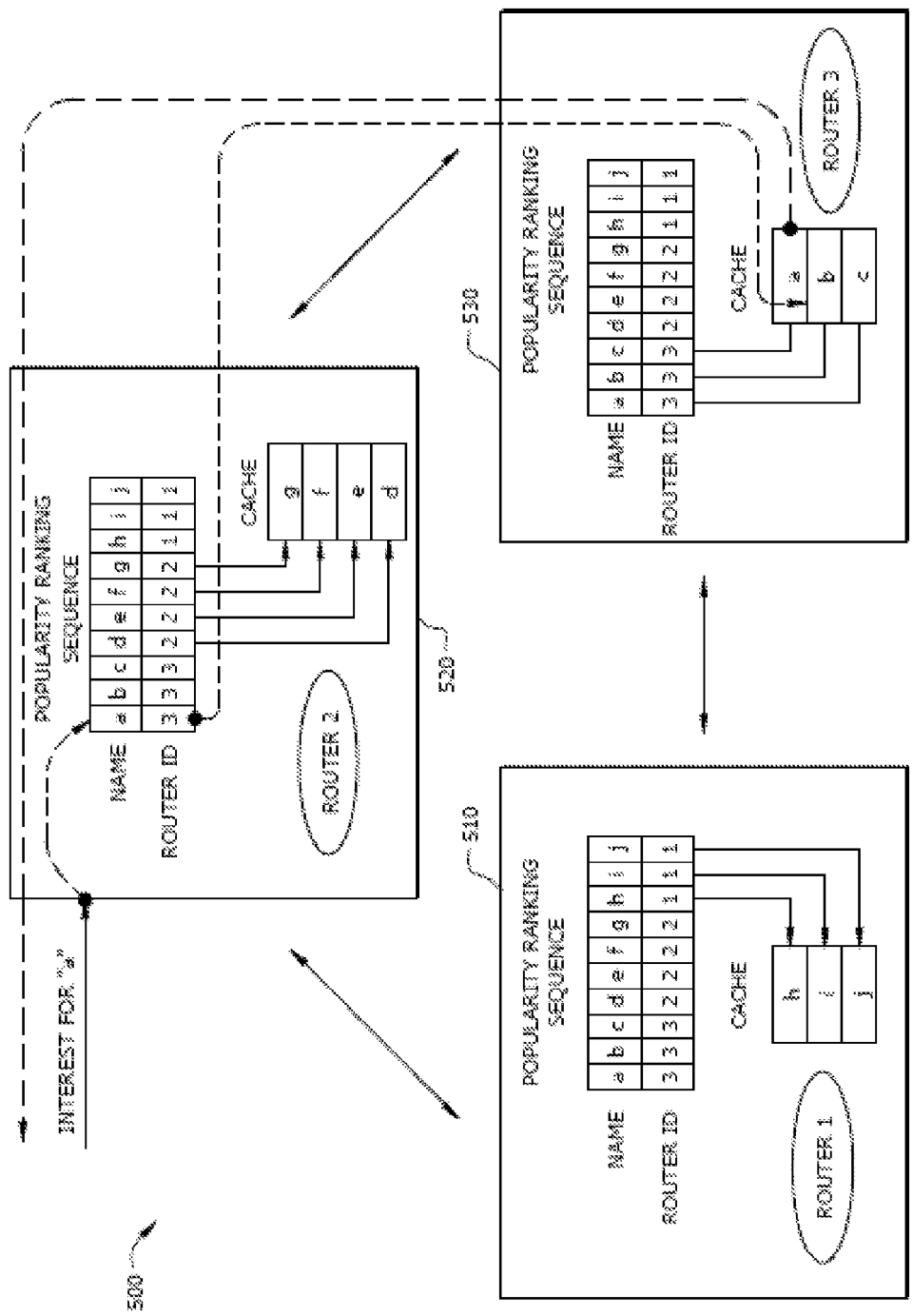
FIG. 5 is a schematic diagram of an embodiment of a collaborative caching scenario.

FIG. 5 illustrates an embodiment of a collaborative caching scenario 500, which may be used in a CON at a plurality of collaborative caching content routers, such as the collaborative caching content router 100. In the collaborative caching scenario 500, a plurality of collaborative routers may cache a plurality of content objects. For instance, the collaborative routers may comprise a first router 510 (router 1), a second router 520 (router 2), and a third router 530 (router 3). In the scenario 500, the routers may cache up to about ten content objects, where the size of the collaborative cache at router 1 may be three, the size of the collaborative cache at router 2 may be four, and the size of the collaborative cache at router 3 may be three. The most popular content objects measured by the three routers may be the same, as shown in the popularity ranking sequence in FIG. 5.

Further, router 1 may have a first link cost ($cost_1$), router 2 may have a second link cost ($cost_2$), and router 3 may have a third link cost ($cost_3$), where $cost_1 \geq cost_2 \geq cost_3$. Thus, the most popular three content objects may be cached in router 3, the next four content objects may be cached in router 2, and the remaining three content objects may be cached in router 1. Each router may keep a mapping table that maps each incoming interest that requests one of the most popular C content objects to a router that caches that content object. The router may be the same router that caches the requested content in local cache or another router that caches that content object. For example, the mapping table may correspond to the AFIB 140 or the combined collaborative caching data structure 300. In the collaborative caching scenario 500, the routers may have the popularity ranking sequence for most popular C content objects.

Figure 6:
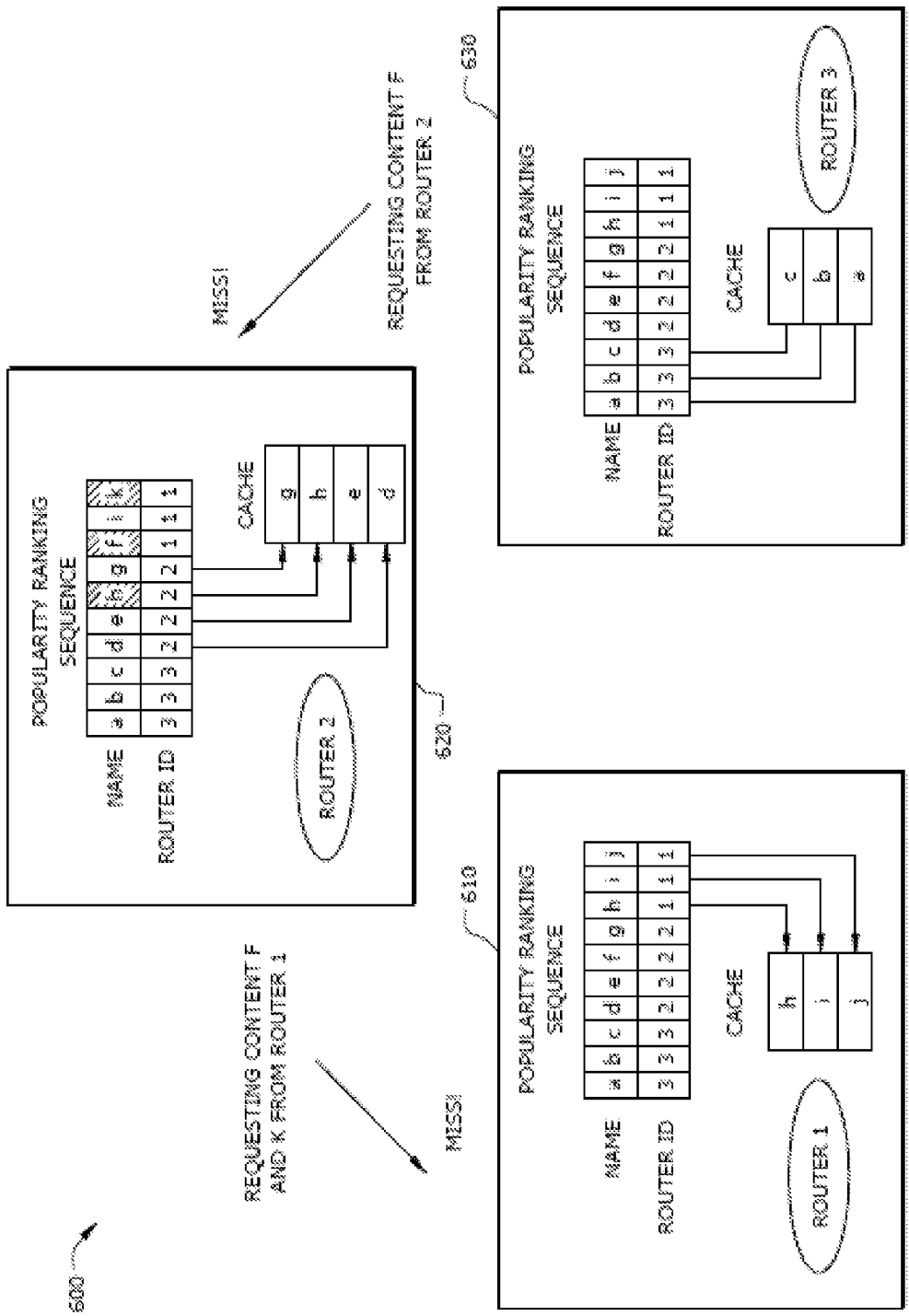
FIG. 6 is a schematic diagram of another embodiment of a collaborative caching scenario.

If the ranking sequence of the most popular C content objects seen by different routers is different, then the efficiency of the collaborative caching scheme above may be degraded. FIG. 6 illustrates another embodiment of a collaborative caching scenario 600, which may be used in a CON at a plurality of collaborative routers. The routers may comprise a first router 610 (router 1), a second router 620 (router 2), and a third router 630 (router 3), which may cache up to about ten content objects. Specifically, the size of the collaborative cache at router 1 may be three, the size of the collaborative cache at router 2 may be four, and the size of the collaborative cache at router 3 may be three. The ranking sequence of router 2 may be different from that of router 1 and router 3. In the ranking sequence of router 2, content objects h and f may be swapped and content object k may replace content j in the top C popular ranking sequence. As a result, router 2 may cache content objects {d, e, h, g}, instead of {d, e, f, g} as routers 1 and 3. When router 1 or router 3 forwards a request for content object f to router 2, there may be a cache miss since router 2 may not have content object f in its cache. Similarly, router 2 may forward an interest requesting content object f or k to router 1, which may result in a cache miss.

A router may cache the content objects based on the router's perspective of popularity (e.g., according to measurements). However, the router may not necessarily cache the content objects that are cached from other routers' perspective (such as content f). Interests requesting such content objects may be forwarded to this router, resulting in cache misses and introducing more cost (as shown in FIG. 6). Further, the union of the top-C popular content objects seen by the N routers may comprise more than C content objects, which may be larger than the total size of the N caches. To address the above issues, a router's cache space may be divided into two segments. A first segment may correspond to a collaborative cache that is operated as described above (e.g., as in the scenario 500). The first segment is referred to herein as an "Advertised Cache", with a size denoted as $C_i'$. A second segment may correspond to a cache space used for adapting the inconsistency of popularity distribution. The second segment is referred to herein as a "Complementary Cache", with a size denoted as $C_i''$.

When a router that uses the two segments receives an interest from another collaborative router and determines that the requested content (in the receiving router's ranking sequence) is not within the range of the ranking sequence of the router, the router may get the content from the content source and store the content in the second segment, based on a Least Recent Use (LRU) caching policy. When the distribution of content popularity seen by each router is similar but with a percentage of mismatches or shifts, the content that is expected by a router to be stored at another router but is missed in the Advertised Cache segment of the other router may still have a relatively large chance to be stored in the Complementary Cache segment of the other router, although the distribution seen by the other router may be different. This may substantially reduce the cache miss rate and make the collaborative caching more effective. The router may only advertise a part of the router's actual cache size, e.g., the size of the Advertised Cache, to other routers and the remaining part may be used as cache space for the Complementary Cache. Thus, the cache space of the Complementary Cache may reduce the remaining cache space of the Advertised Cache.

Figure 7:
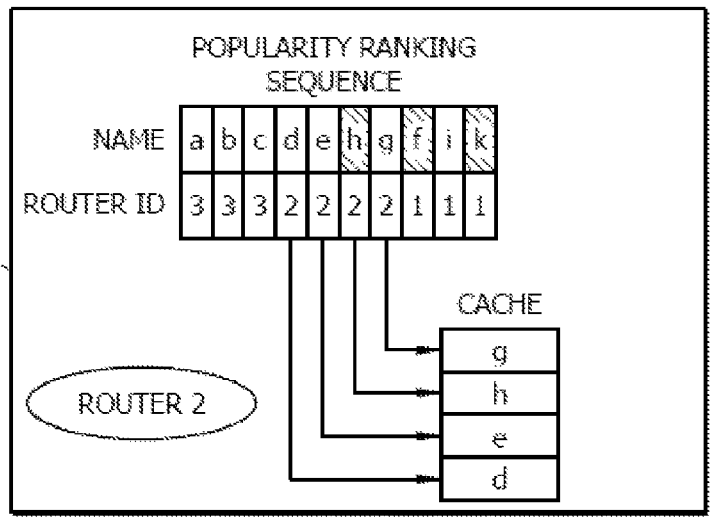
FIG. 7 is a schematic diagram of an embodiment of collaborative caching designs.
Figure 7:
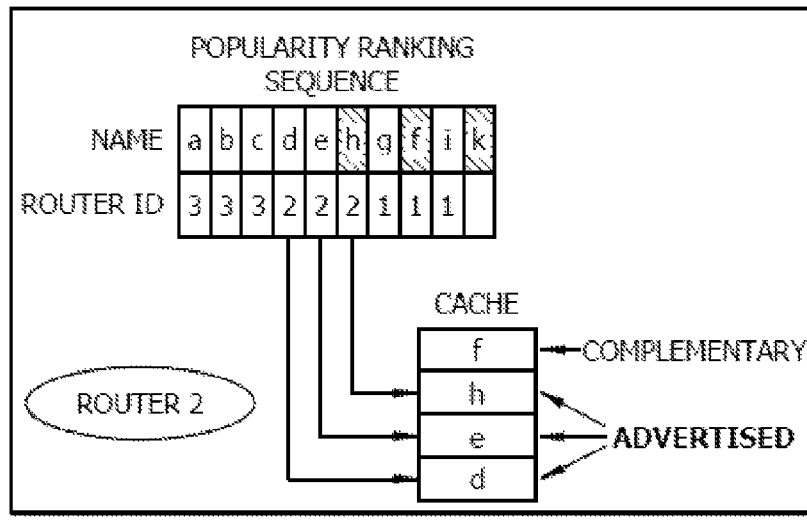

FIG. 7 illustrates an embodiment of collaborative caching designs 700, which may be used in a CON at a plurality of collaborative routers. The collaborative caching designs 700 include: (a) one-segment basic design 710, and (b) two-segment design 720. The designs may be used in router 2 in the scenarios above. The one-segment basic design 710 corresponds to a collaborative cache that is operated as described in the scenario 500, where collaborative caches assumed to have the same popularity ranking sequence. The two-segment design 720 may comprise the two cache segments, the Advertised Cache and Complementary Cache, which may improve collaborative caching efficiency, e.g., when the distribution of content popularity seen by different routers is similar but with a percentage of mismatches or shifts. Using the one-segment basic design 710, a content f, which may be expected to be cached in router 2, may be missed due to the inconsistent ranking statistics of router 2 with other collaborative routers (e.g., router 1 and 3 above). However, with the improved two-segment design 720, router 2 may advertise a cache size of three instead of four. As a result, an extra cache unit may be used to handle the cache misses, and thus store content f. Subsequently, further interests requesting content f and forwarded from routers 1 and 3 may not be missed at router 2. The size of the Complementary Cache may be related to the performance of the collaborative caching. For instance, a larger Complementary Cache may have enough space to adapt to the inconsistency of content popularity distribution seen by all the routers, while a smaller Complementary Cache and hence a larger Advertised Cache may store more content objects in the network.

In the two-segment design 720 for collaborative caching routers, the Advertised Cache and Complementary Cache may be divided to allow the routers to use a determined percentage of the routers' cache spaces, e.g., about 20% of space dedicated to the Complementary Cache (with size $C_i'$) and the remaining space to the Advertised Cache (with size $C_i''$) for each router. However, using this fixed-split-ratio approach, the mismatch that the routers experience in the corresponding ranking sequences may be different, which may result in inefficient use of the cache spaces. This may be observed in FIG. 6 and FIG. 7, where in the case of a Complementary Cache of size one for router 2, the caching efficiency may be substantially improved. However, if the same Complementary Cache is assigned to router 1 and router 3, then the size of the Advertised Caches for router 1 and 3 may be reduced, and hence the overall efficiency may be reduced, since router 1 and router 3 may not experience ranking inconsistency as much as router 2. The routers 1 and router 3 may not have cache misses when router 2 uses a two-segment cache design (as shown in FIG. 7). Thus, there may be no need to assign any Complementary Cache space for router 1 and router 3.

The cache miss rate may have an important role in the efficiency of collaborative caching. When the cache miss rate is substantially high, the content objects that are expected to be stored in a collaborative cache may not be found, and thus there may be additional cost to query the collaborative cache, instead of directly getting the content from the origin or source. When the cache miss rate is substantially low, the performance may still not be satisfactory. A relatively small cache miss rate may correspond to an oversized Complementary Cache, which may reduce the total number of content objects cached in the network and degrade performance. To address the above issues, an algorithm may be implemented to dynamically adjust the sizes of the Advertised and Collaborative caches according to the detected cache miss rate. In an embodiment a dynamic cache division algorithm may be used, where a Locking Miss Rate (denoted as LMR) may be defined, such that each router may change the size of the corresponding local Complementary Cache to achieve a cache miss rate close to or equal to about the LMR. This adaptive or dynamic cache division algorithm may be implemented using the following or similar instructions:

---

Algorithm 1 Dynamic Cache Division Algorithm

1: Initialize $C_i'$ and $C_i''$ such that $C_i' + C_i'' = C_i$.
2: Measure MR for interests from other collaborative routers
3: if (MR < 90%LMR ) then
4:    $C_i'' \leftarrow 2C_i''$.
5:    $C_i' \leftarrow C_i - C_i''$.
6: else if (MR > 110%LMR) then
7:    $C_i' \leftarrow C_i'/(1 + MR)$.
8:    $C_i'' = C_i - C_i'$.
9: end if

---

A router may be initiated with a pre-configured initial cache division, e.g., about 90% and 10% as the cache split ratio (for the Advertised and Complementary Caches, respectively). The router may then begin measuring the cache miss rate for all or a plurality of interests received from other collaborative routers (or users). The measured cache miss rate is denoted as MR. If MR is smaller than LMR, which may indicate that the size of the Complementary Cache $C_i''$ is too large, then $C_i''$ may be reduced (e.g., by half), and hence the size of Advertised Cache $C_i'$ may increase to cache more content objects in the network. If MR is larger than LMR, which may indicate that $C_i''$ is too small and there may be too many cache misses, then $C_i'$ may be decreased, e.g., linearly reduced as shown in the algorithm above, to reduce the cache miss rate. The algorithm above and simulation results using the algorithm are described in detail in Shuo Guo, et al. in Huawei internal publication, entitled "Popularity-Ranking Based Collaborative Caching for Content-Oriented Networks," Huawei Central Research, Advanced Technologies Labs, U.S., which is incorporated herein by reference as if reproduced in its entirety. In other embodiments, other dynamic or adaptive algorithms may be used to adapt the two cache segments sizes based on the cache miss rate and/or other factors that may be associated with the two cache segments sizes. Such algorithms may dynamically change the cache segments sizes, e.g., at different instances, as needed.

Figure 8:
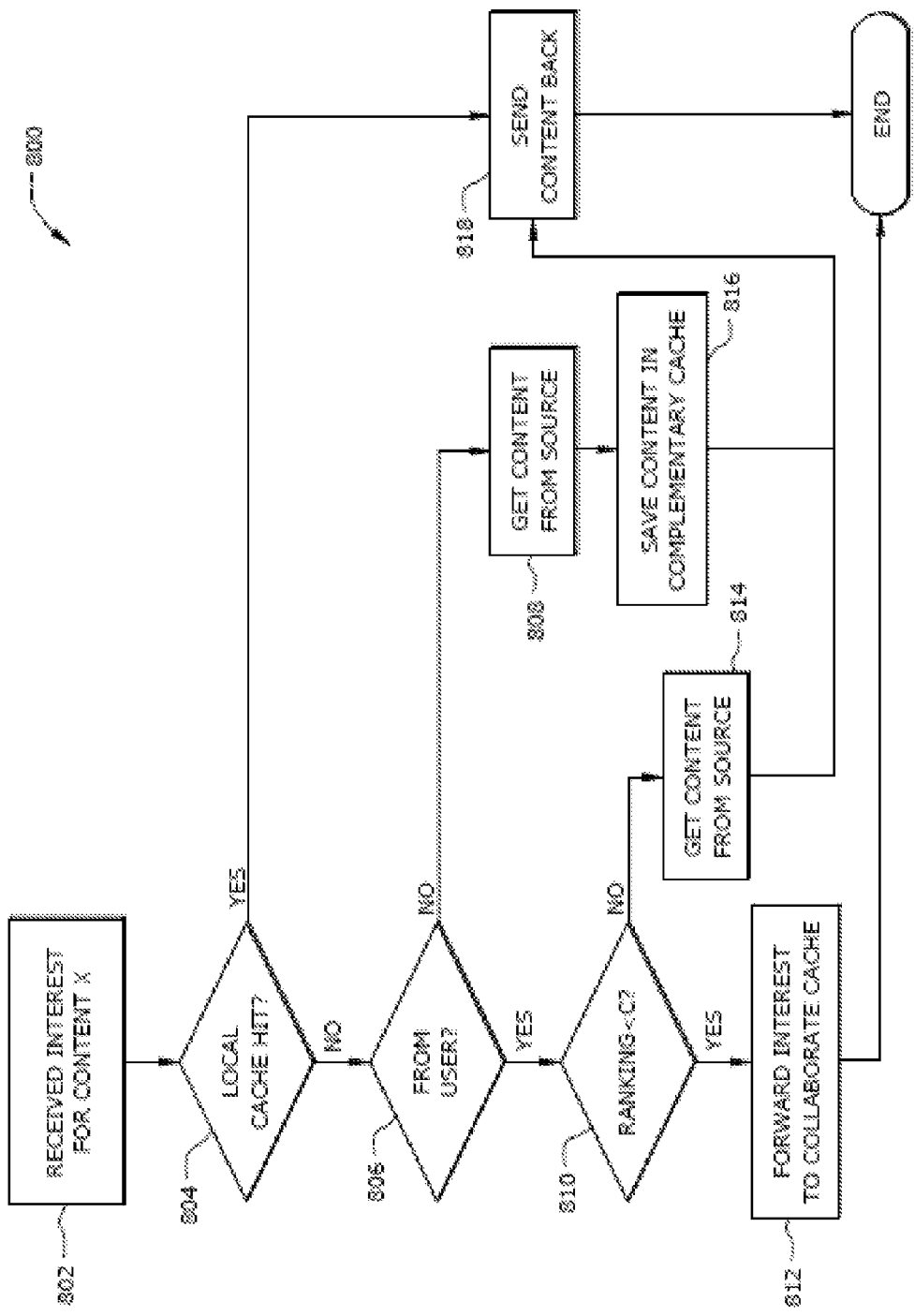
FIG. 8 is a flowchart of an embodiment of a collaborative caching interest processing method.

FIG. 8 illustrates an embodiment of a collaborative caching interest processing method 800, which may be used to handle received interests in a collaborative cache. The collaborative caching interest processing method 800 may be implemented by a collaborative caching router in the CON, such as the collaborative caching router 100. The router may be configured based on the two-segment cache design above and may comprise and Advertised Cache and Complementary Cache. The method 800 may begin at block 802, where an interest for content may be received. At block 804, the router may check the local cache to determine if there is a hit. If the condition of block 804 is true (a hit is found), then the method 800 may proceed to block 818. Otherwise, if the content does not exist in the router's local cache, then the method 800 may proceed to block 806. At block 806, the router may check whether this content request is from a user or another collaborative router. If the content is from a user, then the method 800 may proceed to block 810. Otherwise, if the content request is from another router, then the method 800 may proceed to block 808. At block 808, the router may get the content from a source of the content. At block 816, the content may be saved or stored in the Complementary Cache in the router, and the method 800 may proceed to block 818. At block 810, the router may verify whether the ranking of the requested content is smaller than C. If the condition in block 810 is true, then method 800 may proceed to block 812. Otherwise, the method 800 may proceed to block 814. At block 812, the interest may be forwarded to a collaborative cache in another router, and the method 800 may then end. At block 814, the router may get the content from the source, and the method may proceed to block 818. At block 818, the router may send the content back to the requesting router or user, and the method 800 may then end.

Figure 9:
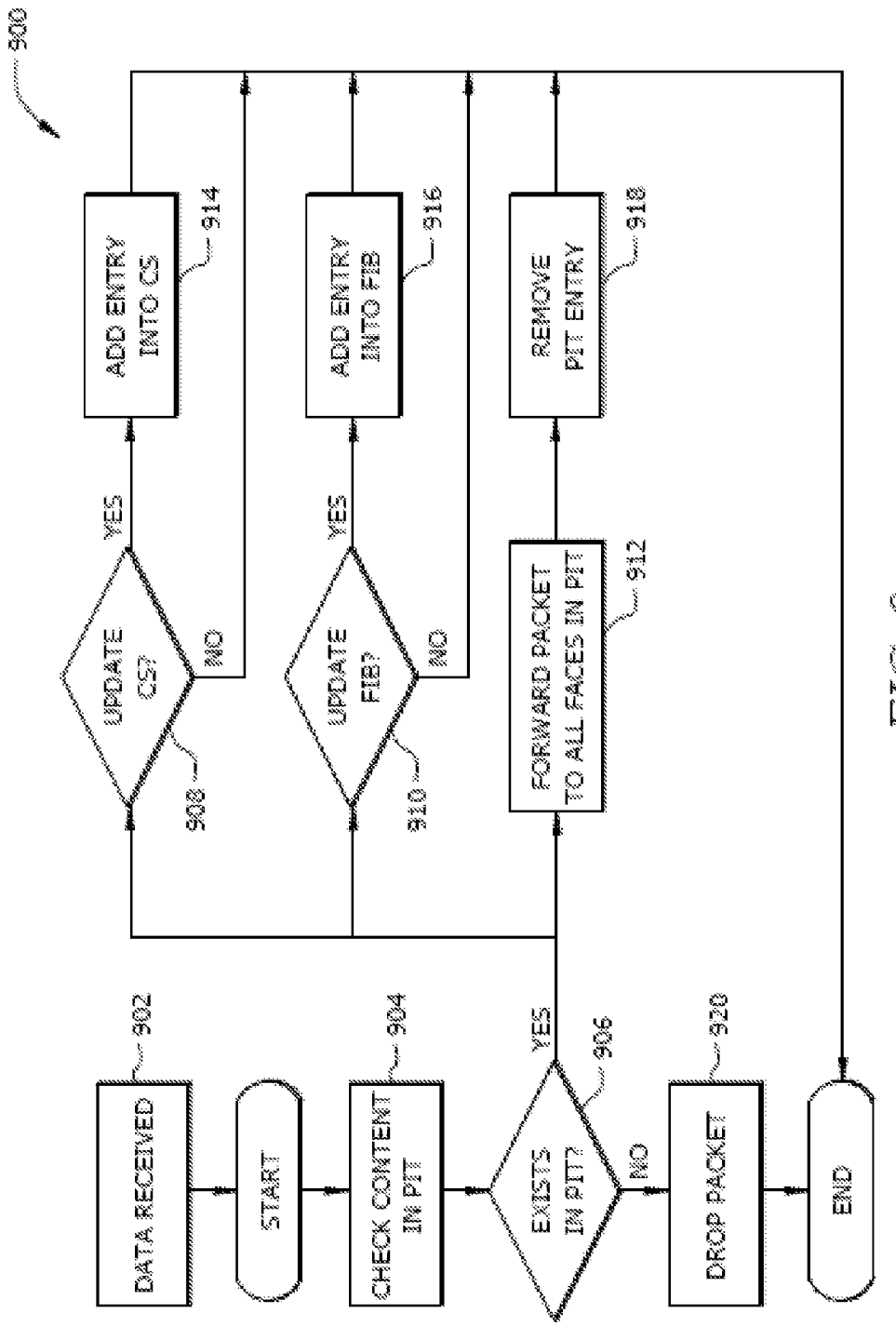
FIG. 9 is a flowchart of an embodiment of a collaborative caching data processing method.

FIG. 9 illustrates an embodiment of a collaborative caching data processing method 800, which may be used to handle received response data to previously processed interests in a collaborative cache. For instance, the collaborative caching data processing method 900 may be implemented by a router when a data is received in response to forwarding an interest request, e.g., using the collaborative caching data processing method 800. The method 900 may begin at block 902, where content data may be received. At block 904, the router may check or search for the associated content in a local PIT. At block 906, the router may determine whether the content exists in the PIT. If the content is found in the PIT, then the method 900 may proceed to blocks 908, 910, and 912, which may be implemented in parallel or consecutively. Otherwise, if the content does not exist in the PIT, then the method 900 may proceed to block 920. At block 908, the router may check if a local CS requires updating, such as to cache at least the received data or related information. If the condition in block 908 is true, then the method 900 may proceed to block 914, or otherwise the method 900 may end. At block 914, an entry corresponding to the received data may be added into the CS, and the method 900 may then end. At block 910, the router may check if a local FIB requires updating, such as to associate the received data with a face or port. If the condition in block 910 is true, then the method 900 may proceed to block 916, or otherwise the method 900 may end. At block 916, an entry corresponding to the received data may be added into the FIB, and the method 900 may then end. At block 912, the received data packet may be forwarded to all faces in the PIT. Subsequently, at block 918, the router may remove the PIT entry corresponding to the received data, and the method 900 may then end. At block 920, the received data packet may be dropped, and the method 900 may then end.

The collaborative caching scheme may be a fast-path or data-plane scheme, meaning where the scheme and may change the way how data/forwarding-plane works in conventional CONs and legacy networks. In conventional CONs, forwarding may be relatively independent of collaborative caching. For instance, each router may only check if the router's local cache has the requested content. If the content is not found, then the request packet may be forwarded to upstream routers. In legacy networks (e.g., content distribution networks), collaborative caching may operate totally independent of forwarding. The collaborative caching may operate in the same plane where forwarding operates (the data plane), and both collaborative caching and data forwarding may depend on each other. Further, collaborative caching may enable the router to determine where the request packet is to be forwarded to (including but not limited to the upstream routers).

Figure 10:
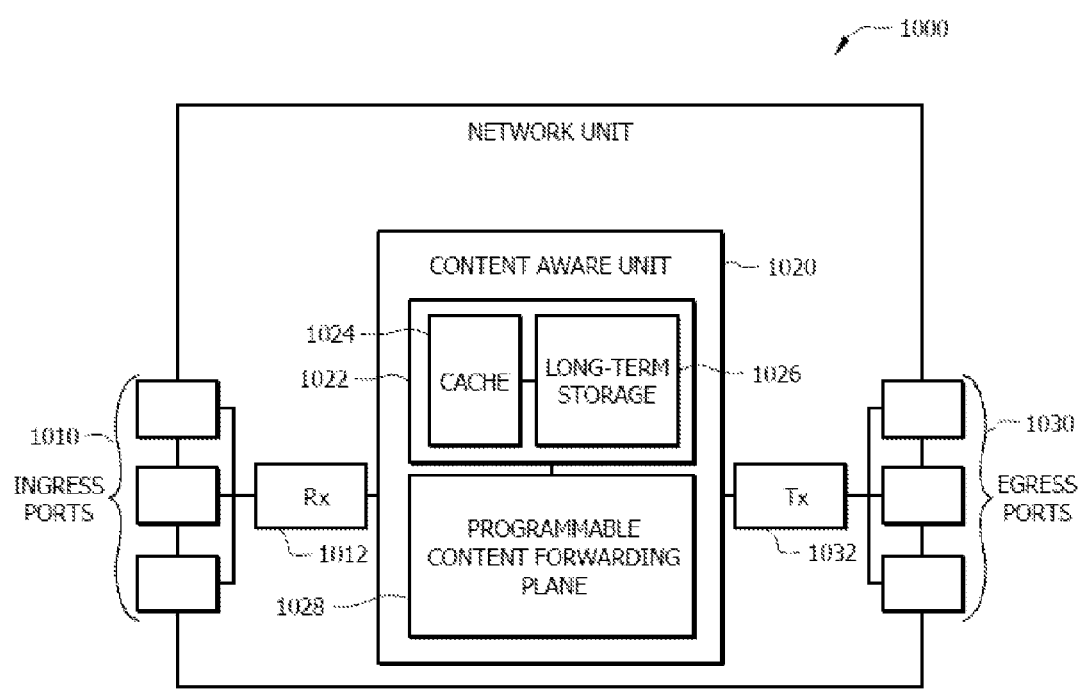
FIG. 10 is a schematic diagram of an embodiment of a network unit.

FIG. 10 illustrates an embodiment of a network unit 1000, which may be any device that transports and processes data through a network. For instance, the network unit 1000 may correspond to a collaborative content router, such as the collaborative caching content router 100 or may be located in a CON. The network unit 1000 may also be configured to implement or support the scenarios, algorithms, and methods described above, such as the two-segment cache design and the methods 800 and 900. The network unit 1000 may comprise one or more ingress ports or units 1010 coupled to a receiver (Rx) 1012 for receiving signals and frames/data from other network components. The network unit 1000 may comprise a content aware unit 1020 to determine which network components to send content to. The content aware unit 1020 may be implemented using hardware, software, or both. The network unit 1000 may also comprise one or more egress ports or units 1030 coupled to a transmitter (Tx) 1032 for transmitting signals and frames/data to the other network components. The receiver 1012, content aware unit 1020, and transmitter 1032 may also be configured to implement at least some of the disclosed scenarios, algorithms, and methods above, which may be based on hardware, software, or both. The components of the network unit 1000 may be arranged as shown in FIG. 10.

The content aware unit 1020 may also comprise a programmable content forwarding plane block 1028 and one or more storage blocks 1022 that may be coupled to the programmable content forwarding plane block 1028. The programmable content forwarding plane block 1028 may be configured to implement content forwarding and processing functions, such as at an application layer or L3, where the content may be forwarded based on content name or prefix and possibly other content related information that maps the content to network traffic. Such mapping information may be maintained in one or more content tables (e.g., CS, PIT, FIB, and AFIB) at the content aware unit 1020 or the network unit 1000. The programmable content forwarding plane block 1028 may interpret user requests for content and accordingly fetch content, e.g., based on meta-data and/or content name (prefix), from the network or other content routers and may store the content, e.g., temporarily, in the storage blocks 1022. The programmable content forwarding plane block 1028 may then forward the cached content to the user. The programmable content forwarding plane block 1028 may be implemented using software, hardware, or both and may operate above the IP layer or L2.

Further, the programmable content forwarding plane block 1028 may implement the collaborative caching scenario, e.g., using the tow-segment cache design, the adaptive or dynamic cache division algorithm, and the methods 800 and 900. The storage blocks 1022 may comprise a cache 1024 for temporarily storing content, such as content that is requested by a subscriber. Additionally, the storage blocks 1022 may comprise a long-term storage 1026 for storing content relatively longer, such as content submitted by a publisher. For instance, the cache 1024 and the long-term storage 1026 may include Dynamic random-access memories (DRAMs), solid-state drives (SSDs), hard disks, or combinations thereof.

Figure 11:
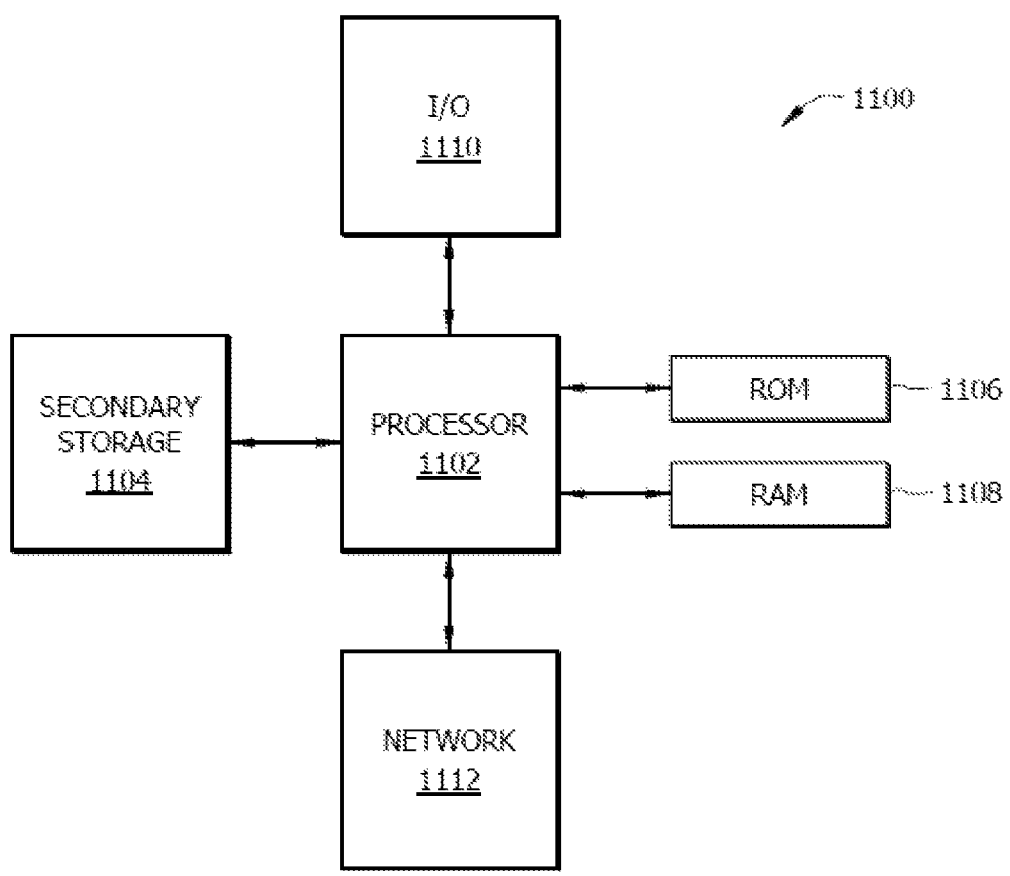
FIG. 11 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 11 illustrates a typical, general-purpose network component 1100 suitable for implementing one or more embodiments of the components disclosed herein. The network component 1100 includes a processor 1102 (which may be referred to as a central processor unit or CPU) that is in communication with memory devices including secondary storage 1104, read only memory (ROM) 1106, random access memory (RAM) 1108, input/output (I/O) devices 1110, and network connectivity devices 1112. The processor 1102 may be implemented as one or more CPU chips, or may be part of one or more application specific integrated circuits (ASICs).

The secondary storage 1104 is typically comprised of one or more disk drives or tape drives and is used for non-volatile storage of data and as an over-flow data storage device if RAM 1108 is not large enough to hold all working data. Secondary storage 1104 may be used to store programs that are loaded into RAM 1108 when such programs are selected for execution. The ROM 1106 is used to store instructions and perhaps data that are read during program execution. ROM 1106 is a non-volatile memory device that typically has a small memory capacity relative to the larger memory capacity of secondary storage 1104. The RAM 1108 is used to store volatile data and perhaps to store instructions. Access to both ROM 1106 and RAM 1108 is typically faster than to secondary storage 1104.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A content router comprising:
 a plurality of interfaces configured to receive and forward a plurality of interests for content and content data in a content oriented network (CON);
 a cache configured to store content data; and
 a memory component configured to maintain:
  a forward information base (FIB) that associates content with one or more interfaces on which the interests and content data are received and forwarded;
  a pending interest table (PIT) for tracking pending requests for content;
  a content store (CS) for caching content; and
  an availability FIB (AFIB) that associates content data with one or more corresponding collaborative caching routers in the CON that cache the content data.

2. The content router of claim 1, wherein the content data associated with the collaborative caching routers in the AFIB are ranked according to content popularity in the CON, and wherein the content popularity is based on a quantity of received interests from a plurality of users of the CON.

3. The content router of claim 2, wherein at least some of the collaborative caching routers have different corresponding link costs, and wherein one or more most popular content data are cached at the collaborative caching routers that have the lowest link costs.

4. The content router of claim 1, wherein the content data associated with the collaborative caching routers in the AFIB comprise one or more content objects stored in the cache and one or more content objects stored at one or more of the collaborative caching routers.

5. The content router of claim 4, wherein at least some of the collaborative content routers store different quantities of content objects than stored in the cache of the content router.

6. The content router of claim 1, wherein the cache is split into:
 an advertised cache segment that stores content data advertised to the collaborative caching routers; and
 a complementary cache segment that stores content data without advertisement to the collaborative caching routers, and
 wherein the advertised cache segment is larger in size than the complementary cache segment.

7. The content router of claim 6, wherein the content data stored in the advertised cache segment and the content data stored in the complementary cache segment are differently ranked according to popularity in the content router and the collaborative caching routers.

8. The content router of claim 6, wherein the complementary cache segment's size and the advertised cache segment's size are configured to dynamically change based on a quantity of most popular content objects, a cache miss rate of the content router, or both.

9. A network component comprising:
 a transmitter/receiver (transceiver) configured to receive and forward interests and content data in a network;
 a memory; and a processor coupled to the memory and the transceiver, wherein the memory comprises:
  a content store (CS) for caching content;
  a pending interest table (PIT) for tracking pending requests for content;
  a forwarding information base (FIB) for associating content with one or more interfaces; and
  an availability information base (AIB) for associating content with one or more collaborative caches and ranking the content according to content popularity in the network.

10. The network component of claim 9, wherein the FIB comprises a plurality of content name prefixes each associated with one or more corresponding interfaces on which the content is received or forwarded, and wherein the AIB comprises a plurality of content name prefixes each associated with one or more corresponding content routers comprising the collaborative caches that cache corresponding content.

11. The network component of claim 10, wherein the content routers are indicated using a plurality of router identifiers (IDs) in the AIB.

12. The network component of claim 9, wherein the FIB and the AIB are combined in a single data structure that comprises a plurality of content name prefixes associated with a plurality of content routers comprising the collaborative caches that cache corresponding content and with a plurality of corresponding interfaces on which the corresponding content is received or forwarded.

13. The network component of claim 9 further comprising:
  a collaborative cache map component configured to receive and gather propagated information regarding the network's topology and collaborative caching;
  a user interest measurement component configured to measure a popularity ranking sequence for the content in the network;
  a collaborative caching mechanism component configured to utilize a dynamic cache size mechanism to cache the most popular content in the network; and
  a cache performance evaluation component configured to measure a cache miss rate for the interests received from a plurality of content routers and provide feedback to the content routers to support collaborative caching between the content routers.

14. The network component of claim 9, wherein the FIB and the AIB are maintained and operated to process and forward the interests and content data at a data plane, and wherein the AIB is updated and advertised to a plurality of content routers that comprise the collaborative caches at a control plane.

15. A method implemented by a network component, comprising:
  joint collaborative caching for a plurality of content objects that are distributed between a plurality of content routers in a network;
  maintaining a plurality of mappings between the cached and distributed content objects and the corresponding content routers;
  forwarding, using a transmitter, a plurality of received interests and data for the content objects among the content routers at a data plane;
  collecting, using a receiver, information about topology and collaborative caching in the network;
  measuring, using a processor, a ranking sequence for a quantity of most popular content objects in the network based on the received interests from the content users;
  caching in a cache a subset of the quantity of most popular content objects in the network;
  measuring a cache miss rate of the received interests; and
  using the measured cache miss rate to adjust a size of an advertised cache portion and a complementary cache portion of the cache.

16. The method of claim 15 further comprising:
increasing the size of the advertised cache portion to increase the cached subset of the quantity of most popular content objects in the network if the measured cache miss rate is smaller than a threshold for collaborative caching for the content routers in the network; and
increasing the size of the complementary cache portion to reduce the cache miss rate if the measured cache miss rate is larger than the threshold.

17. The method of claim 15 further comprising:
receiving an interest for a content object;
returning the content object if the content object is available in the cache;
forwarding the interest to a source of the content if the interest is received from one of the content routers and the content object is not in the cache;
forwarding the interest to the source of the content if the interest is received from a content user, the content object does not belong to the most popular content objects in the network, and the content object is not in the cache; and
forwarding the interest to a collaborative content router if the interest is received from a content user, the content object belongs to the most popular content objects in the network, and the content object is not in the cache.

18. The method of claim 17 further comprising:
receiving the content object from the source of the content in response to forwarding the interest to the source;
caching the received content object in the complementary cache portion if the interest was received from one of the content routers; and
returning the content object.

19. The method of claim 15 further comprising:
receiving content data;
dropping the content data if the content data is not indicated in a local pending interest table (PIT);
forwarding the content data on one or a plurality of interfaces associated with the content data in the PIT if the content data is indicated in the PIT; and
removing an entry for the content data from the PIT if the content data is indicated in the PIT.

20. The method of claim 19 further comprising:
adding an entry for the content data in a content store (CS) if the content data is indicated in the PIT; and
adding an entry for the content data in a forward information base (FIB) if the content data is indicated in the PIT.

21. A network component comprising:
a transmitter/receiver (transceiver) configured to receive and forward interests and content data in a network;
a memory; and
a processor coupled to the memory and the transceiver, wherein the memory comprises:
  a content store (CS) for caching content;
  a pending interest table (PIT) for tracking pending requests for content;
  a forwarding information base (FIB) for associating content with one or more interfaces;
  an availability FIB (AFIB) for associating content with one or more collaborative caches and ranking the content according to content popularity in the network;

a collaborative cache map component configured to receive and gather propagated information regarding the network's topology and collaborative caching;
a user interest measurement component configured to measure a popularity ranking sequence for the content in the network;
a collaborative caching mechanism component configured to utilize a dynamic cache size mechanism to cache the most popular content in the network; and
a cache performance evaluation component configured to measure a cache miss rate for the interests received from a plurality of content routers and provide feedback to the content routers to support collaborative caching between the content routers.

* * * * *